United States Patent [19]

Smolik

[11] Patent Number: 4,703,593
[45] Date of Patent: Nov. 3, 1987

[54] WALL HEADER

[76] Inventor: Robert A. Smolik, 670 W. Seventh St., St. Paul, Minn. 55102

[21] Appl. No.: 876,414

[22] Filed: Jun. 20, 1986

[51] Int. Cl.⁴ ............................................. A47K 3/16
[52] U.S. Cl. .................................. 52/34; 248/DIG. 6
[58] Field of Search ............................ 52/317, 34–36; 248/57, 231.2, DIG. 6; 211/206, 191; 403/242, 252, 254, 167, 206, 191

[56] References Cited

U.S. PATENT DOCUMENTS

| | | |
|---|---|---|
| 498,563 | 5/1893 | Montgillion . |
| 659,350 | 10/1900 | Osborn . |
| 2,023,083 | 12/1935 | Knell ........................ 248/DIG. 6 X |
| 2,905,416 | 9/1959 | Wiegand ........................ 403/167 X |
| 2,994,114 | 8/1961 | Black . |
| 3,163,386 | 12/1964 | Collins ............................. 248/57 X |
| 3,174,592 | 3/1965 | Berman et al. . |
| 3,305,981 | 2/1967 | Biggs et al. . |
| 3,358,848 | 12/1967 | Johnsson ......................... 403/167 X |
| 3,394,507 | 7/1968 | Doke . |
| 3,528,636 | 9/1970 | Schmidt ............................... 248/57 |
| 3,648,419 | 3/1972 | Marks . |
| 3,718,307 | 2/1973 | Albanese ........................... 248/57 X |
| 3,733,755 | 5/1973 | Butler . |
| 3,867,047 | 2/1975 | Wightman et al. ................. 403/242 |
| 4,007,570 | 2/1977 | Hunter . |
| 4,021,988 | 5/1977 | Edens et al. .................... 403/274 X |
| 4,123,879 | 11/1978 | Blodee et al. . |
| 4,324,076 | 4/1982 | Honickman . |
| 4,403,708 | 9/1983 | Smolik . |
| 4,483,453 | 11/1984 | Smolik . |
| 4,576,302 | 3/1986 | Smolik . |

Primary Examiner—Carl D. Friedman
Attorney, Agent, or Firm—Burd, Bartz & Gutenkauf

[57] ABSTRACT

Wall construction including a wall header for mounting appliances, such as sinks, shelves, electrical receptacle boxes and the like on a wall. Parallel, C-shaped cross-sectional wall studs have major side members provided with vertically aligned mounted openings at regularly spaced intervals along the length thereof. The wall header includes a body having a flat front face for disposition relatively flush to the mounting plane defined by the wall studs, first and second mounting fingers extended from a first end, and third and fourth mounting fingers extended from a second end of the body. The mounting fingers engage mounting holes and are bent over the edges of the holes to secure the body in place. One end of the body has a peripheral recess. The purpose of the peripheral recess is to accommodate the inwardly turned lip portion usually associated with metal wall studs used in construction. The peripheral recess permits flush installation of the wall header with respect to the mounting plane defined by the wall studs.

11 Claims, 11 Drawing Figures

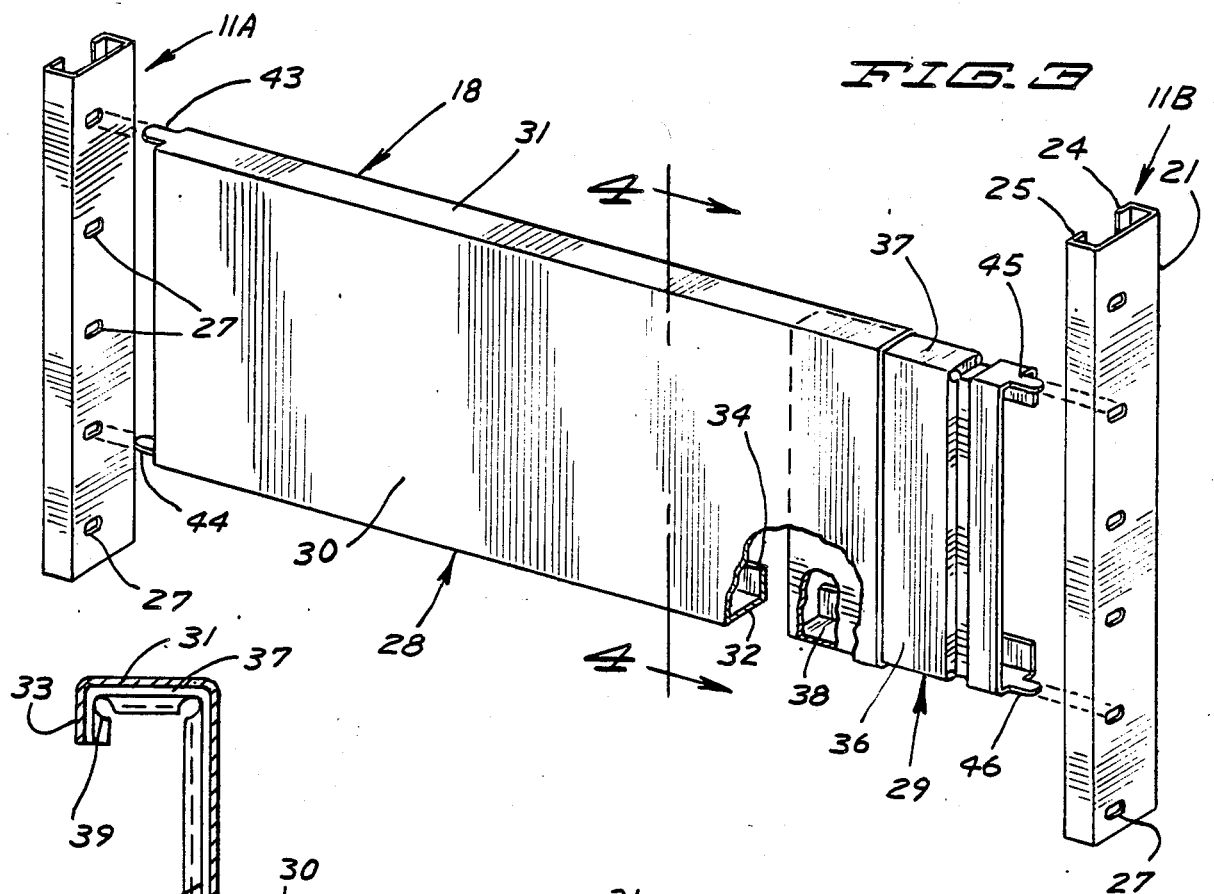
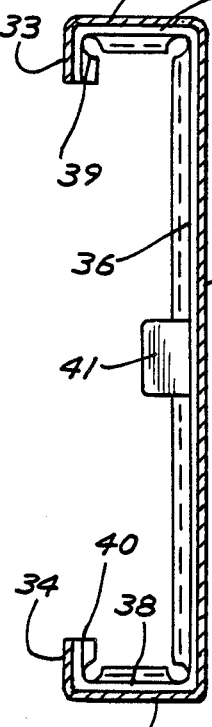
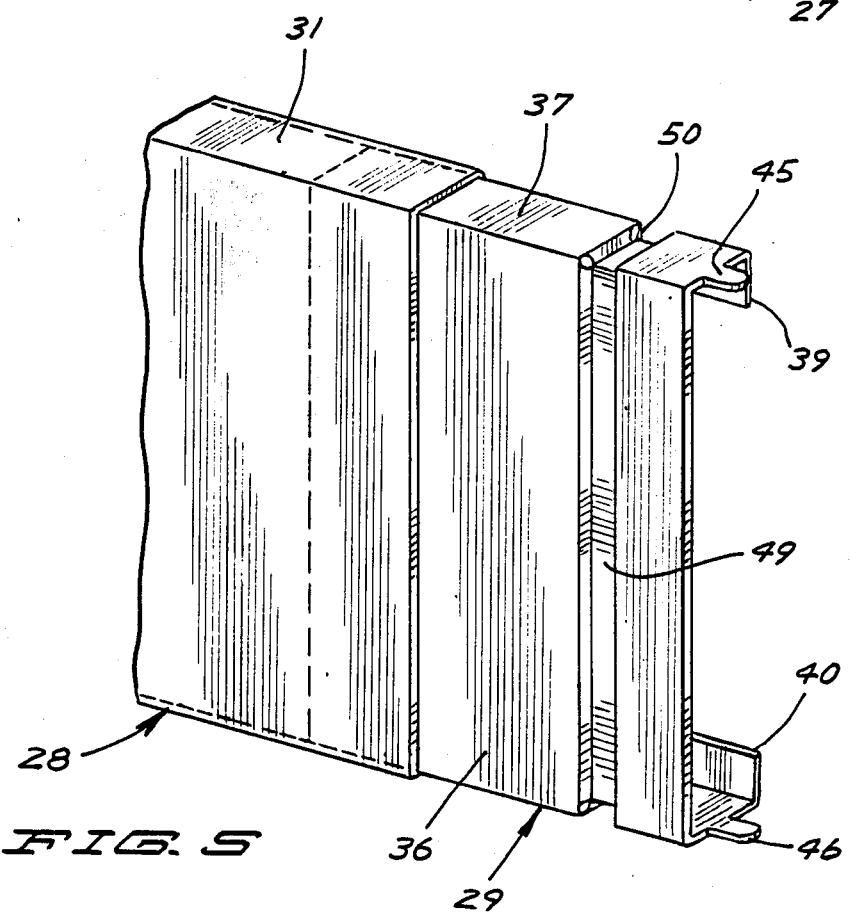

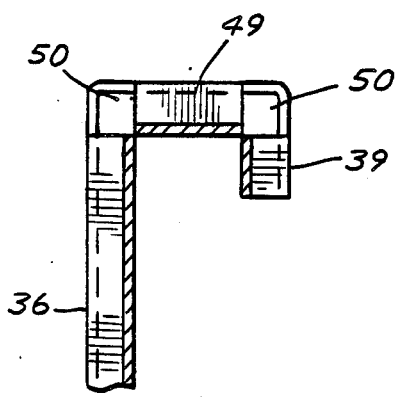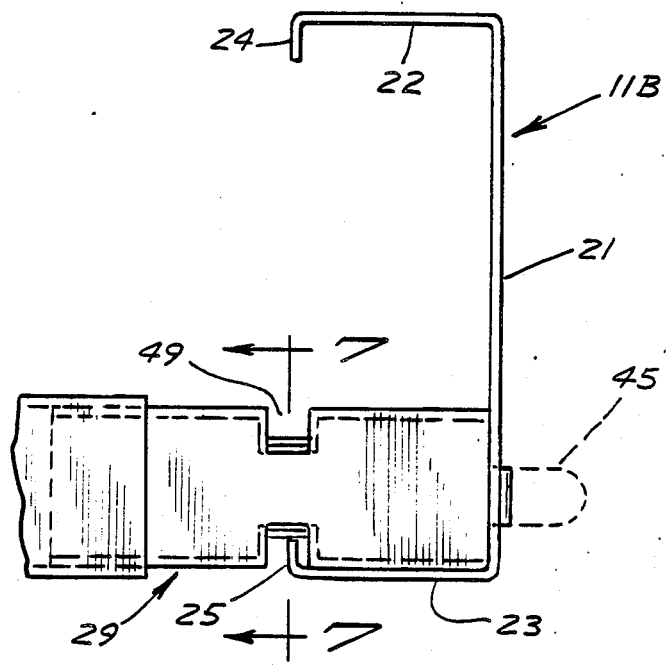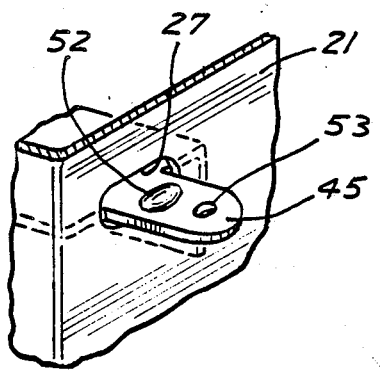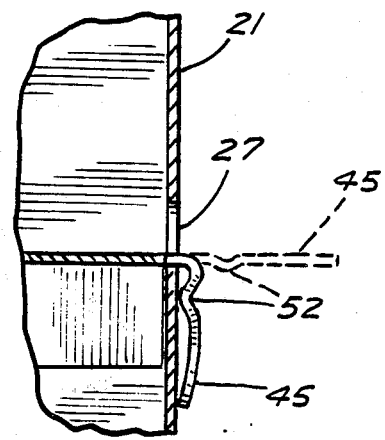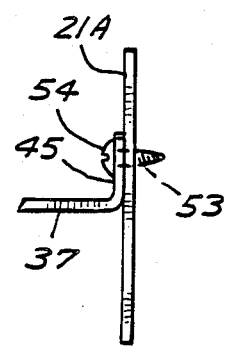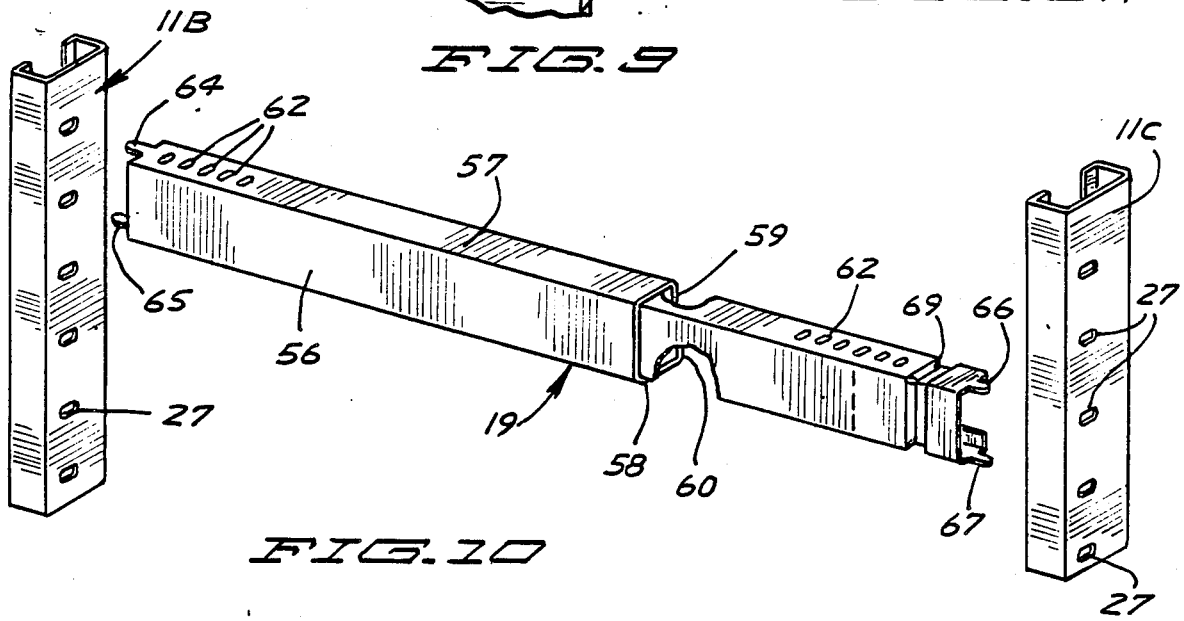

WALL HEADER

BACKGROUND OF THE INVENTION

In building construction, wall headers of the type contemplated by the present invention are substantial construction members that are secured between upright wall joists or studs during construction and are located behind the wall after construction is complete. The headers provide backing for the mounting of various appliances on the wall after completion of the wall. Such appliances can include heavy objects, such as sinks, cabinets and the like, whereby a relatively substantial header is required. Smaller appliances, such as an electrical wall outlet box to be located intermediate between wall studs, can employ a relatively lighter header.

According to common procedures, headers are construction members formed of wooden construction beams carefully measured and then nailed or otherwise secured between upright wall studs at the proper location. The tedious measurement and individual construction of each wall header is time consuming in an industry where conservation of time is important in keeping costs under control.

SUMMARY OF THE INVENTION

According to the present invention, there are provided construction headers readily mounted between vertical wall studs for the mounting of various appliances upon a finished wall. The header can be adjustable in length for adjustment according to the distance between adjacent mounting wall studs. The headers are particularly adapted for mounting with respect to vertical metal wall studs of the type having a C-shaped profile with inwardly directed lips extended from the sides of the wall stud inward of the channel of the wall stud, and with a series of vertically aligned mounting holes prepared in the major side member of the wall stud.

The header has a main body portion having forwardly and upwardly directed mounting surfaces for mounting appliances in front of or behind a wall constructed on the mounting wall studs. The ends of the headers are equipped with tabs which extend through the mounting holes prepared in the walls studs and can be turned outwardly once extended through the mountng opening in order to maintain the header in place. In the instance where the vertical wall studs do not have mounting openings, the tabs are turned upwardly and used in connection with mounting screws to mount the header in place. A recess is located proximate one of the ends of the header in order to fit the end of the header in the channel of the mounting beam with the lip located in the recess.

IN THE DRAWINGS

FIG. 3 is an assembly view in perspective with portions removed for purposes of illustration showing one of the wall headers of FIG. 2 according to one form of the invention;

FIG. 4 is an enlarged sectional view of the wall header of FIG. 3 taken along the line 4—4 thereof;

FIG. 5 is an enlarged perspective end view of a portion of the wall header of FIG. 3;

FIG. 6 is a top view of an end portion of the wall header of FIG. 2 in assembled relationship relative to a vertical wall stud;

FIG. 7 is an enlarged sectional view of a portion of the wall header of FIG. 6 taken along the line 7—7 thereof;

FIG. 8 is a perspective view of a connecting member of the header installed through a mounting hole in a wall stud;

FIG. 9 is a side elevational view of the connecting member shown in FIG. 8 installed with respect to the wall stud;

FIG. 9A is an enlarged view similar to FIG. 9 showing the connecting member of a header installed with respect to a wall stud of the type not having mounting holes; and FIG. 10 is an assembly view of the other wall header of FIG. 2 according to a modification of the invention.

DESCRIPTION OF PREFERRED EMBODIMENTS

Figure 1:
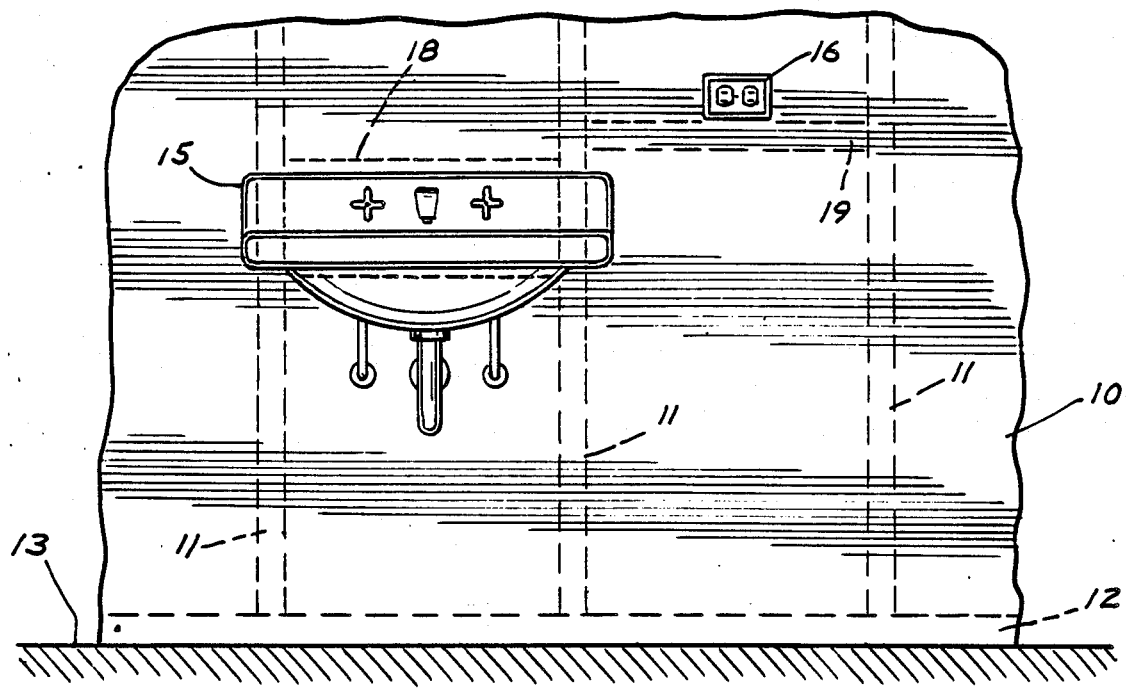
FIG. 1 is a front plan view of a wall with appliances installed thereon shown to include a sink and an electrical receptacle box installed with respect to wall headers of the invention mounted between adjacent vertical wall studs.

Referring to the drawings, there is shown in FIG. 1 a wall indicated generally at 10 constructed of wallboard or like surface installed on vertical wall studs 11 assembled to a lower support beam 12 mounted on a floor 13. A sink 15 is mounted on one portion of a wall and an electrical receptacle outlet 16 is mounted closely adjacent thereto. The sink 15 is mounted on a wall header 18 according to one form of the present invention. The electrical receptacle outlet 16 is mounted on a wall header 19 according to another form of the invention. The wall headers 18 and 19 are mounted between adjacent vertical wall studs 11 located behind the wall surface 10.

Figure 2:
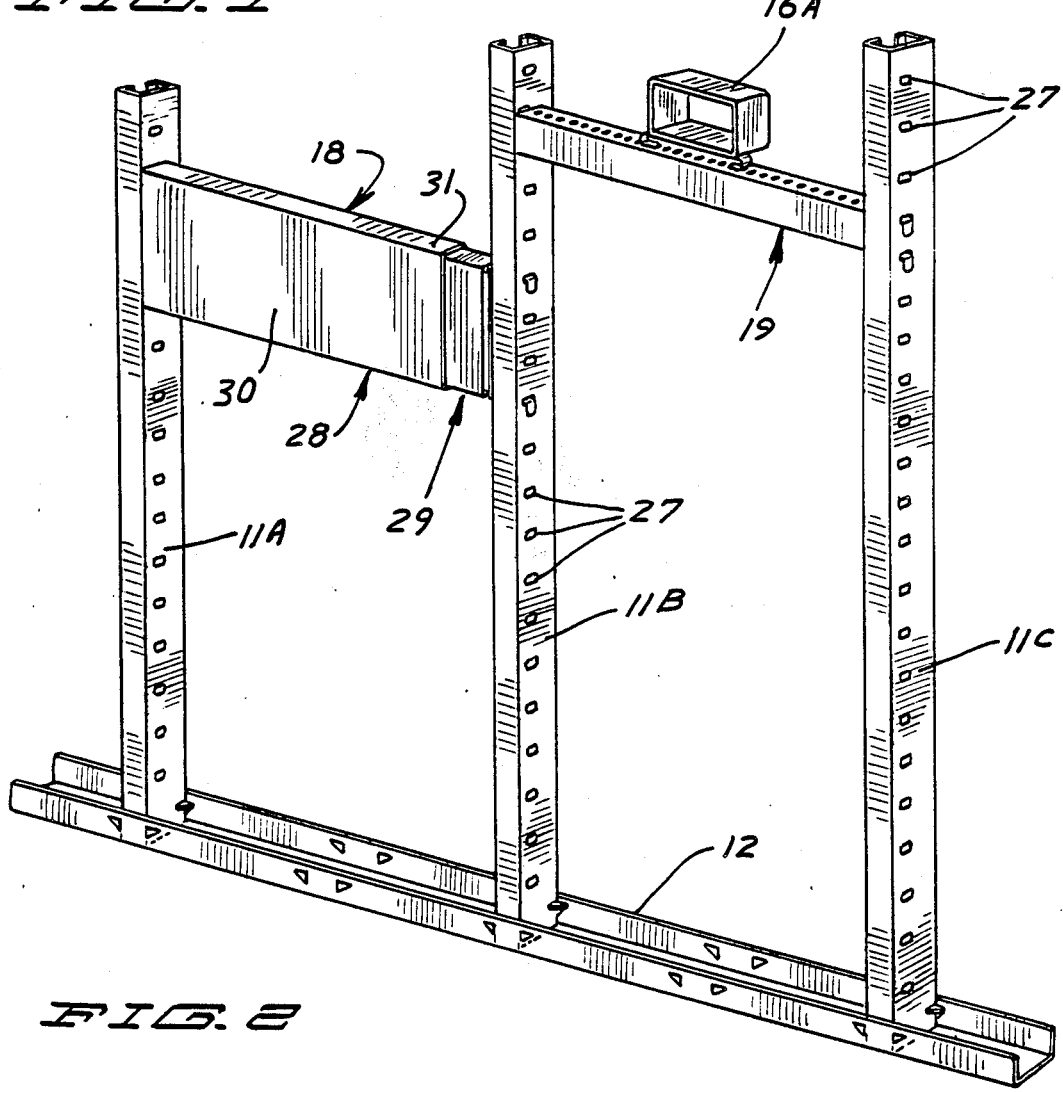
FIG. 2 is an enlarged perspective view of the wall construction of FIG. 1 with the wallboard and sink removed therefrom.

FIG. 2 shows a perspective view of the wall stud and header construction of FIG. 1 with the wallboard removed. Each wall stud is of the C-shaped cross-sectional variety fabricated of metal, having a major side member 21 (see FIG. 6), end members 22, 23 perpendicular to the major side member 21, and lips 24, 25 extending inwardly from the edges of the end members 21, 22 opposite the major side member 21. The lips 24, 25 extend inwardly a short distance toward one another forming a channel between them. The major side member 21 of each of the metal wall studs 11 is equipped with a plurality of vertically aligned openings 27. Openings 27 are oblong with horizontal major axes. The lower ends of the wall studs 11 are situated in the support beam 12. Support beam 12 is channel-shaped and upwardly open, having a plurality of pockets formed by inwardly directed projections comprised as punched-out portions of the side walls of the beam. The projections form rectangular shaped pockets indicated at 20 for the receipt of the end portions of the wall studs 11.

The openings 27 along the length of the wall stud 11 are regularly spaced apart and correspond in horizontal alignment to openings on the other wall studs. The mounting openings are used to mount the wall headers 18, 19 preparatory to installation of wall surface and appliances. The end members of the wall studs 11 define a frontal wall plane for installation of wall surface. The headers 18, 19 have front surfaces mounted flush with the same plane.

As shown in FIG. 3, the wall header 18 is mounted to adjacent vertical wall studs 11A, 11B. The horizontal length of the header 18 is adjustable for installation between adjacent vertical wall studs spaced apart at various distances. Wall header 18 is comprised of a C-shaped, box-like unit having an elongate body comprised of a first section 28 and a second section 29 telescopically engaged in one end of the first section 28. First section 28 has an expansive forward face 30 with upper and lower perpendicular walls 31, 32. Upper and lower flanges 33, 34 extend toward one another parallel to front face 30 from upper and lower walls 31, 32. Forward face 30 is adapted for situation flush with the plane of the wall studs behind a wall surface presenting a flat, large expanse for the mounting of a heavy appliance, such as a sink. Second section 29 also has a forward face 36 with top and bottom perpendicular walls 37, 38 and inwardly turned upper and lower flanges 39, 40. The C-shaped profile presented by the second section 29 is slightly smaller in dimension than that of the first section 28, such that the second section 29 telescopically fits in an end of the first section 28 and is movable back and forth therein prior to mounting with respect to the vertical wall studs 11. A handle 41 (FIG. 4) is fixed to the second section 29 for conveniently grasping and sliding the second section 29 with respect to the first section 28. The forward faces 30, 36 are substantially greater in width than the top and bottom walls.

The end of first section 28 opposite the second section 29 has upper and lower bendable mounting flanges 43, 44. The upper mounting finger 43 is comprised as a flat horizontal extension of the top wall 31. The lower bendable mounting finger 44 is comprised as a flat extension of the lower wall 32 of the first section 28. The fingers are spaced apart a vertical distance corresponding to a whole multiple of the spacing between the mounting holes 27. As shown, the fingers are spaced apart a distance three times the spacing between mounting holes. Each finger has a transverse dimension corresponding to but slightly smaller than the transverse horizontal dimension of the mounting holes 27. The fingers can be inserted in the mounting holes 27 and bent over the hole edge to secure the first section 28.

The second section 29 of header 18 also has bendable mounting fingers or tabs 45, 46 which extend horizontally away from the upper and lower walls 37, 38. The fingers 45, 46 are also spaced apart a distance corresponding to a multiple of the spacing between the mounting holes 27 on the vertical wall stud 11B. The mounting fingers 45, 46 are insertable in mounting holes 27 on the vertical wall stud 11B and the mounting fingers 43, 44 are insertable in corresponding mounting holes 27 on an adjacent vertical wall stud 11A. The second section 29 is slidable with respect to the first section 28, such that the spacing between the ends of the header 18 will be correct.

The outer end of the first section 28 carrying the first and second mounting fingers 43, 44 faces the exterior surface of the major side member 21 of wall stud 11A. The fingers are readily insertable without opposition into respective mounting holes 27. The third and fourth mounting fingers 45, 46 are inserted through the mounting holes 27 on the opposite surface of major side member 21 of wall stud 11B, or by pasing through the channel formed by the lips 24, 25 of the wall stud. A lip 25 of the wall stud 11B poses an obstacle to proper positioning of the fingers 45, 46 in mounting holes 27 to mount the front faces 30, 36 of first and second sections 28, 29 relatively flush with the front plane of the wall studs. Accordingly, there is provided a necked-in portion or peripheral recess 49 proximate the end of the second section 29 for accommodation of a lip 25 of the wall stud 11B when the header 18 is installed. As shown in FIGS. 5 through 7, recess 49 parallels the cross-sectional profile of second section 29, extending parallel to the lips 39, 40, upper and lower walls 37, 38, and the side wall 36. The portion of the recess 29 located on the front face 36 is parallel to the lip 25 on the wall stud 11B. As shown in FIG. 6, when the second section 29 is installed with respect to the wall stud 11B, the lip 25 is accommodated in the recess 49 to permit passage of the finger 45 through a mounting opening 27 and position the front face 36 relatively flush with the plane defined by the wall studs 11. The depth of the recess 49 corresponds roughly to the length of the lip 25. The distance between the recess 49 and the end of the second section 29 corresponds roughly to the distance between the lips 24, 25 and the inner surface of the major side member 21.

Header 18 is secured in place with respect to wall studs 11 by fingers 43–46. The fingers 43–46 are inserted through mounting holes 27 with the peripheral recess 49 of the second section 29 in position accommodating an otherwise obstructing lip 25. The fingers are manually bent over the edges of the mounting holes to secure the header 18 in place. As shown in FIGS. 8 and 9, a finger 45 can have a dimple 52 located on the finger proximate the edge of the hole 27 and directed outwardly in the direction of intended bending of the finger 45. Upon bending of the finger 45, the dimple 52 first contacts the edge of surface 21 near the hole 27 and thereafter serves as a fulcrum for further bending of the finger 45. Further bending of the finger 45 about the fulcrum provided by the dimple 52 pulls the remainder of the header toward the hole 27 to more firmly secure it in place.

As further shown in FIGS. 8 and 9A, a mounting finger 45 is provided with a fastener hole 53. The fastener hole 53 is for use when the header 18 is installed with respect to wall studs that are not prepared with mounting holes 27 but rather present blank surfaces. In FIG. 9A a wall stud surface 21A does not have mounting holes. The finger 45 is bent at approximately a 90-degree angle with respect to the surface 37 of the header 18. The finger is positioned adjacent the surface 21A in a fastener such as a sheet metal screw 54 is inserted through the fastening hole 53 and through the metal surface 21A of a wall stud. With each of the mounting fingers 43–46, so connected to the wall studs, header 18 is secured in place with respect to those wall studs not having mounting holes prepared therein.

The telescopic engagement of the second section 29 with the first section 28 provides a measure of adjustability of the length of the header 18, although generally it will be installed in construction where standard distances are used between studs. In certain instances, the distance between studs will be even shorter than normal, such that header 18 in the shortest condition will still be too long. In such instances, the second section 29 is removed from the first section 28. The section 28 is shortened by removing a segment from the end opposite the mounting fingers 43, 44 of such length as is necessary. The second section 29 is then reinserted in the first section 28 and the mounting procedure followed as disclosed herein.

The second form of wall header 19 is smaller and can be used to mount smaller appliances of the type having a portion located behind the wall. As shown, an electrical receptacle box 16 is mounted on the header 19 and is of the type shown in U.S. Pat. No. 4,403,708, issued Sept. 13, 1983, disclosing an electrical receptacle box having a plurality of mounting tines located on a side of the box and insertable under slight spring tension into mounting holes prepared along one side of the header.

As shown in FIG. 10, header 19 is the elongate, beam-like member with a flat front face or wall 56, a top wall 57, a bottom wall 58 and upper and lower flanges 59, 60 extending toward one another from the top and bottom walls respectively. The top wall 57 of header 19 is prepared with a series of aligned, regularly spaced apart mounting holes 62 for receipt of appliances of the type having mounting tines or the like as shown in FIG. 2.

One end of the header 19 carries first and second mounting fingers 64, 65 horizontally extended from the top and bottom walls 57, 58 and vertically spaced apart a distance corresponding to a whole multiple of the spacing between mounting holes 27 or, in this instance, spaced apart according to the space between adjacent mounting holes 27. The fingers 64, 65 have a transverse dimension generally corresponding to the major axis of the oval mounting holes 27. The mounting fingers 64, 65 are manually bendable, such that upon insertion in the mounting holes 27, they can be bent over the edge, as previously described, to hold the header in place. Third and fourth mounting fingers 66, 67 extend from the top and bottom walls 57, 58 of header 19 at the opposite end thereof and are symmetrical to the first and second mounting fingers 64, 65 for insertion in corresponding mounting holes 27 in the upright wall stud 11C. The end of header 19 carrying the third and fourth fingers 66, 67 is inserted in the wall stud through the channel defined by the lips 24, 25. Accordingly, proximate that end there is provided a recess 69 of the type earlier described with respect to the first header 18. Recess 69 generally parallels the cross-sectional profile of the header 19 extending from the upper lip 59 across the top 57 down the front face 56 across the lower wall 58 and the lower lip 60. The recess 69 is of a sufficient depth to accommodate a flange 25 that would otherwise obstruct the positioning of the third and fourth fingers 66, 67 in the mounting holes 27 and the positioning of the front face 56 to a location closely adjacent the wallboard plane of studs 11B, 11C.

The small header 19 can be used to mount electrical receptacle boxes as shown on the top or bottom walls thereof, or it can be used to mount smaller appliances from the outside, such as a shelf. The headers can be used in pairs vertically spaced apart to mount objects having recessed portions, such as vanities.

Once installed with respect to the vertical wall studs, the headers are very secure and not only provide structural members for the mounting of various appliances, but they serve as well to tie together adjacent wall studs to form a stronger composite structure.

While there has been shown and described certain headers and wall construction according to the invention, it will be apparent that certain deviations can be had therefrom without departing from the scope and spirit of the invention.

The embodiments of the invention in which an exclusive property or privilege is claimed are defined as follows:

1. A wall header for flush installation between first and second adjacent upright parallel wall studs of the type having a C-shaped cross-sectional profile and a major side member provided with vertically aligned, regularly spaced apart mounting openings, first and second end members, and first and second lips extended toward one another from the first and second end members forming a channel, said wall studs positioned in uniform relationship with the channel of the second wall stud facing the side opposite the channel of the first wall stud, said wall stud end members defining a wall mounting plane, comprising:

an elongate body having a horizontal, longitudinal dimension sufficient to span the distance between adjacent first and second wall studs;

said body having a generally C-shaped cross-sectional profile with a front wall having a continuous flat mounting face substantially coextensive with the length thereof, a top wall extended in perpendicular relationship from the upper edge of the front wall, an upper flange extended from the edge of the top wall in parallel relationship to the front face, a bottom wall extended in perpendicular relationship from the lower edge of the front wall, a lower flange extended from the edge of the top wall in parallel relationship to the front wall;

a first bendable mounting finger longitudinally extended from a first end of the top wall of the body for connection to a mounting opening on the major side member of a first of said wall studs on the side of the wall stud opposite the end members of the wall stud, a second bendable mounting finger extended longitudinally from a first end of the bottom wall of the body for connection to a mounting opening on said first wall stud, said first and second mounting fingers being spaced inward from the front edges of the front wall a distance to position the front mounting face in generally flush relationship with the end member of the first wall stud;

a third bendable mounting finger longitudinally extended from the second end of the top wall of the body for connection to a mounting opening on the major side member of the second of said wall studs on the same side as the end members of the wall stud, a fourth bendable mounting finger extended longitudinally from the second end of the bottom wall of the body for connection to a mounting opening on the major side member of the second wall stud;

said body having a peripheral recess proximate the end with the third and fourth mounting fingers parallel to the cross-sectional profile of the body accommodating a segment of the lip of the second wall stud when the third and fourth bendable mounting fingers are engaged in mounting holes on the second wall stud, said third and fourth mounting fingers being spaced from the forward edges of the front wall a distance to permit generally flush mounting of the front mounting face with respect to the second wall stud end member.

2. The wall header of claim 1 wherein: said body is comprised of first and second telescoping sections.

3. The wall header of claim 1 wherein: said top wall is provided with a plurality of aligned mounting holes.

4. The wall header of claim 1 wherein: said mounting fingers have fastener holes near the ends.

5. The wall header of claim 1 wherein: each mounting finger has a fastener hole near the tip thereof.

6. Wall construction for installation of an appliance with respect to the wall, comprising:

first and second parallel, adjacent upright wall studs of the type having a C-shaped cross-sectional profile with a major side member, first and second end members, and first and second lips inwardly extended toward one another from the end members forming a channel between them;

said wall studs positioned in aligned relationship with end members forming a front plane for installation of wall surface and with the channel of the second wall stud facing the side opposite the channel of the first wall stud;

the major side members of the wall studs being provided with vertically aligned, regularly spaced mounting openings;

a wall header having an elongate body with a horizontal, longitudinal dimension sufficient to span the distance between the first and second wall studs;

said body having a front wall with a continuous flat forward face substantially coextensive with the length thereof, a top wall extended in perpendicular relationship from the upper forward edge of the front wall, and a bottom wall extended in perpendicular relationship from the lower forward edge of the front wall;

first and second bendable mounting fingers vertically spaced apart a distance that is a whole multiple of the spacing between mounting openings on the wall studs, said first finger longitudinally extended from a first end of the top wall of the body and in bent engagement with a first mounting opening located in the side member of the first wall stud on the surface opposite the end members of the wall stud, said second finger longitudinally extended from a first end of the bottom wall of the body and in bent engagement with a second mounting opening located in the side member of the first wall stud, said first and second mounting fingers spaced inward from the front edges of the forward face to position the forward face in generally flush relationship with respect to the end member of the first wall stud;

third and fourth bendable mounting fingers vertically spaced apart the same distance, said third finger longitudinally extended from the second end of the top wall of the body and in bent engagement with a third mounting opening on the major side member of the second wall stud on the same side as the end members of the wall stud, said fourth finger longitudinally extended from a second end of the bottom wall of the body and in bent engagement with a fourth mounting opening on the major side member of the second wall stud, said third and fourth fingers being spaced inward from the front edges of the front wall a distance to position the front mounting face in generally flush relationship with respect to the end member of the second wall stud;

said body having a peripheral recess proximate the second end thereof parallel to the cross-sectional profile of the body and in engagement with a lip of the second wall stud extended inwardly from a side member a distance to permit said relatively flush mounting of the mounting face of the body with respect to the wall stud plane.

7. The wall construction of claim 6 wherein: said body is comprised of first and second telescoping sections.

8. The wall construction of claim 6 wherein: said body has a generally C-shaped cross-sectional profile with upper and lower flanges extended from the edges of the top and bottom walls.

9. The wall construction of claim 8 wherein: said front wall comprises said mounting face and is substantially greater in width than the top and bottom walls.

10. The wall construction of claim 9 wherein: said body is comprised of first and second telescoping sections.

11. The wall construction of claim 9 wherein: said top wall of the body has a plurality of mounting openings.

* * * * *